Nov. 8, 1966  J. B. THOMSON  3,284,035
MOUNTING FOR ROUND MACHINE WAYS

Filed Aug. 6, 1964  5 Sheets-Sheet 1

INVENTOR.
JOHN B. THOMSON
BY
MORGAN, FINNEGAN, DURHAM & PINE
ATTORNEYS

Nov. 8, 1966 J. B. THOMSON 3,284,035
MOUNTING FOR ROUND MACHINE WAYS
Filed Aug. 6, 1964 5 Sheets-Sheet 3

INVENTOR.
JOHN B. THOMSON
BY
MORGAN, FINNEGAN, DURHAM & PINE
ATTORNEYS

Nov. 8, 1966 — J. B. THOMSON — 3,284,035
MOUNTING FOR ROUND MACHINE WAYS
Filed Aug. 6, 1964 — 5 Sheets-Sheet 4

INVENTOR.
JOHN B. THOMSON
BY
MORGAN, FINNEGAN, DURHAM & PINE
ATTORNEYS

Nov. 8, 1966   J. B. THOMSON   3,284,035
MOUNTING FOR ROUND MACHINE WAYS
Filed Aug. 6, 1964   5 Sheets-Sheet 5

*INVENTOR.*
JOHN B. THOMSON
BY
MORGAN, FINNEGAN, DURHAM & PINE
ATTORNEYS

United States Patent Office 3,284,035
Patented Nov. 8, 1966

3,284,035
MOUNTING FOR ROUND MACHINE WAYS
John B. Thomson, 1029 Plandome Road, Manhasset, N.Y.
Filed Aug. 6, 1964, Ser. No. 387,943
14 Claims. (Cl. 248—23)

This invention relates generally to means for supporting and aligning ways used, for example, in guiding carriages and worktables relatively to the frame of a machine or machine tool, and relates more particularly to a mounting for supporting and aligning a round machine way.

Since the beginning of the machine age, ways on machine tools and other machinery have comprised flat surfaces. These were very expensive to manufacture as they were either laboriously hand scraped to obtain the desired accuracy or ground in a large surface grinder at a very slow rate.

The concept of the cylindrical or round way came with the development of the linear ball and roller bearings to support carriages and worktables in machinery. This enabled the fabrication of a hardened and precision ground way at very low cost by high speed through-feed centerless grinding. As these low cost ways are nearly always used in pairs, they must be accurately positioned with respect to each other as well as to other parts of the machine. Heretofore this has been done by securing them in very accurately machined seats in the machine base member. The machining of these accurate seats is slow and expensive. Moreover, if the length of the way is considerable, often machining is not possible due to the lack of availability of a machine large enough to do the work.

It is therefore an object of this invention to provide a mounting unit for supporting and accurately positioning round machine ways.

A further object of this invention is to provide a mounting unit for a round machine way which will accurately position and secure the way in a desired position of straightness and parallelism.

Another object of this invention is to provide in a mounting unit for round machine ways, adjustable supporting means capable of being adjusted so as to move the way in both vertical and lateral directions, with each movement being independent of the other.

Another object of this invention is to provide a mounting unit for supporting and accurately positioning round machine ways suitable for use on rough or uneven surfaces.

Another object of this invention is to provide a mounting unit for a round machine way which will accurately position and secure the way in a desired position of straightness and parallelism without deflecting the way when being secured in the desired position.

The present invention eliminates the difficulty and expense of providing precision machine seats to align round machine ways by providing a mounting unit which may be used on rough or uneven surfaces and which can be manufactured at low cost. Additionally, the mounting unit of this invention makes adjustment and accurate positioning of a round machine way a simple operation in that the vertical or horizontal adjustment movements can be made independently of each other.

Objects and advantages of the invention are set forth in part herein and in part will be obvious herefrom, or may be learned by practice with the invention, the same being realized and attained by means of the instrumentalities and combinations pointed out in the appended claims.

Briefly described, the preferred form of the present invention comprises a mounting unit for supporting and aligning a round machine way in a desired position of straightness and parallelism. The unit includes a pair of supporting members having opposed inclined bearing surfaces for engaging the way and a shaft hold-down bolt positioned therebetween. The bearing surfaces comprise narrow lands centered near the shaft bolt centerline. The supporting members are connected by a screw having right and left hand threads for moving the supporting members toward and away from each other, thereby adjusting the vertical position of the way. Additionally, the screw is mounted in a bracket and is provided with jam nuts positioned on either side of the bracket for adjusting the lateral position of the supporting members in unison, thereby adjusting the lateral position of the way. The shaft hold-down bolt located between the supporting members secures the way in firm engagement with the bearing surfaces.

Another version of the invention comprises a cylindrical supporting member surrounding the shaft hold-down bolt having its top surface at varying heights around the periphery of the member. The support member is in contact with the shaft on opposite sides of the hold-down bolt. Due to the contour of the top surface of the supporting member, it will raise and lower the shaft upon being rotated. The raising and lowering could also be done by a thread at the top of the supporting member engaging a thread in a shaft counterbore concentric with the hold-down bolt hole. The supporting member is seated in a mating transverse pad which is adjustably attached to the base of the unit or the machine bed. This version of the arrangement provides more vertical adjustment in a given space due to the cylindrical shape of the shaft supporting surfaces. Also, the need for right and left hand threads is eliminated. Horizontal and vertical adjustments are independent of each other and can be done simultaneously.

The invention consists in the novel parts, constructions, arrangements, combinations and improvements herein shown and described.

It will be understood that the foregoing general description and the following detailed description as well are exemplary and explanatory of the invention but are not restrictive thereof.

The accompanying drawings, referred to herein and constituting a part hereof, illustrate preferred embodiments of the invention, and together with the description, serve to explain the principles of the invention.

Figure 1:
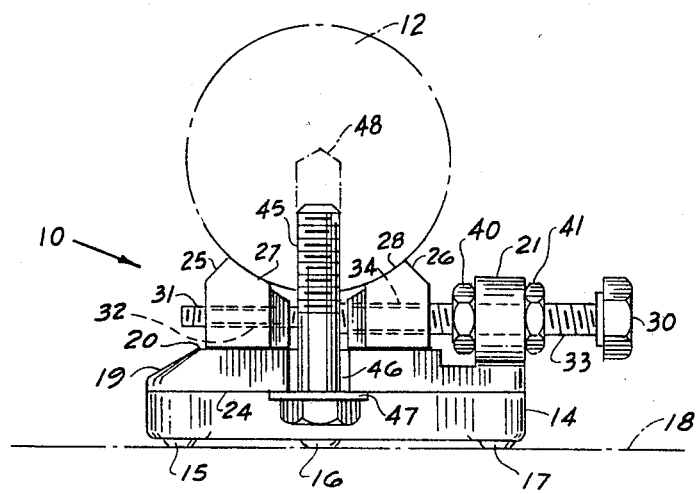
FIGURE 1 is a front elevation of a way mounting unit constructed in accordance with this invention, supporting a way illustrated diagrammatically.
Figure 2:
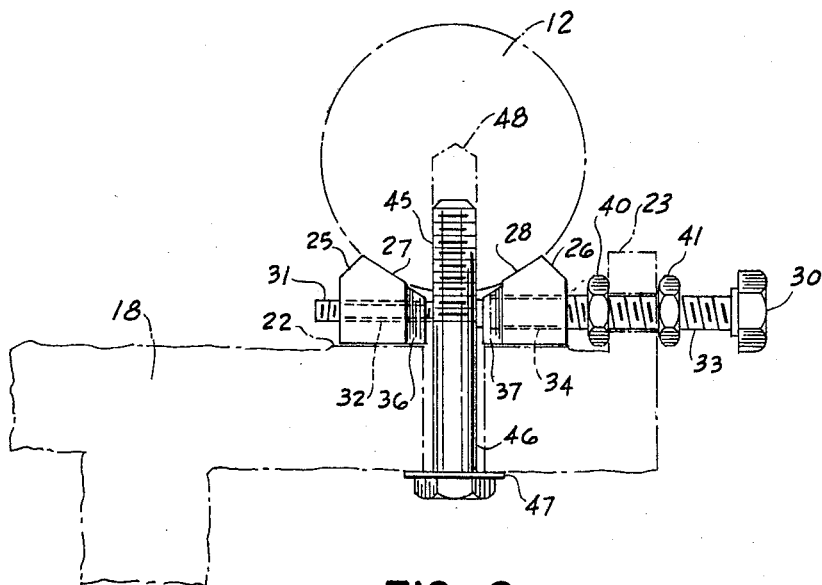
FIGURE 2 is a front elevation of a way mounting unit constructed in accordance with this invention, the way support members being mounted directly to a machine base, illustrated diagrammatically.

Referring now more particularly to the embodiments of the invention shown in the accompanying drawings, there is illustrated in FIGURES 1 and 2 a mounting unit, designated generally by reference numeral 10, supporting a round machine way 12, illustrated diagrammatically.

Mounting unit 10 includes a base; means mounted on the base for supporting a round machine way; vertical adjustment means for adjusting the vertical position of the way; horizontal adjustment means for adjusting the horizontal or lateral position of the way, each of the vertical and horizontal adjustment means operating independently of each other; and means for securely holding the way in contact with the supporting means in its adjusted position of straightness and parallelism.

As here preferably embodied, the base of mounting unit 10 is provided integral therewith, designated by reference numeral 14, the bottom portion thereof having three downwardly extending triangularly spaced legs or pads 15, 16, 17 for resting on the frame 18 of a machine or machine tool. The frame 18 may be rough or uneven since the three-point bearing of the base on the frame prevents rocking. A base hold-down bolt (not shown) may also be provided for threadably engaging frame 18 to hold base 14 firmly on the frame. Base 14 also includes an upper table-like portion 19 having a smooth top surface 20 and, at one edge, an upwardly extending bracket 21.

Alternatively, with reference to FIGURE 2, it will be understood that if the frame or rough base 18 of the machine or machine tool used for supporting the mounting unit of the present invention has a smooth surface thereon, or if a smooth surface may be easily produced, as indicated at 22, then mounting unit 10 may be mounted directly onto the machine base with adjusting screw 30 and jam nuts 40, 41 mounted onto a post extension 23 of base 18.

As here preferably embodied, (FIGURES 4–7) the means for supporting and aligning way 12 comprises a pair of laterally spaced supporting blocks 25, 26 having opposed, inclined narrow lands 27, 28 constituting the bearing surfaces against which the way rests, more fully discussed hereinbelow.

The vertical adjustment means preferably comprises a screw 30 mounted in bracket 21 and having left-hand threads 31 engaging bore hole 32 of block 25 and right-hand threads 33 engaging bore hole 34 of block 26. Thus, clockwise rotation of screw 30 moves supporting blocks 25, 26 towards each other, raising the vertical position of the way while counter-clockwise rotation of screw 30 moves supporting blocks 25, 26 away from each other, lowering the vertical position of the way.

Supporting blocks 25, 26 have opposed quadrant sections 36, 37 hollowed out of the inner vertical portions thereof forming a semi-cylindrical slot for hold-down bolt 45, thereby permitting the blocks to be set in contact with each other for maximum height adjustment. Additionally, it will be understood that maximum lowering adjustment will be determined by the clearance between the surface of the way between bearing lands 27, 28 and the adjustment screw 30.

The horizontal or lateral adjustment means according to the invention preferably comprises a pair of jam nuts 40, 41 threaded onto screw 30 on either side of bracket 21 or post 23. It will be seen that either of jam nuts 40, 41 may be loosened without changing the relative lateral positions of blocks 25, 26 and hence, without disturbing the vertical position of the way. Upon loosening of either nut, the screw and supporting blocks may be simultaneously moved a corresponding lateral distance and thereafter securely held in the new position by screwing down the jam nuts tightly against bracket 21 or post 23.

As here preferably embodied, the means for securely holding way 12 in contact against the bearing lands 27, 28 of the supporting blocks in the desired position of straightness and parallelism comprises a bolt 45 mounted through slotted opening 46 in base 14, or frame 18, in threaded engagement with the way by means of bore-hole 48 provided in the way. The width of slot 46 is sufficiently greater than the diameter of bolt 45 to permit lateral movement of the bolt corresponding to that of the shaft. The head of bolt 45 bears against the underside 24 of table 19 of base 14, or against the underside of frame or rough base 18 when base 14 is not used, through washer 47.

Figure 3:
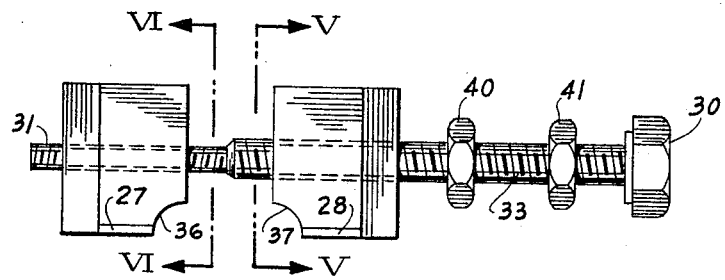
FIGURE 3 is a top plan view of the way supporting members and adjustment screw of the way mounting unit illustrated in FIGURES 1 and 2.
Figure 4:
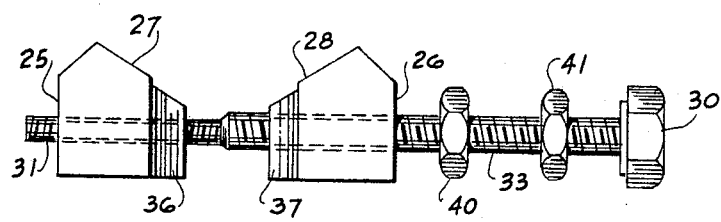
FIGURE 4 is a front elevation of the way supporting members and adjustment screw of FIGURE 3.
Figures 5, 6:
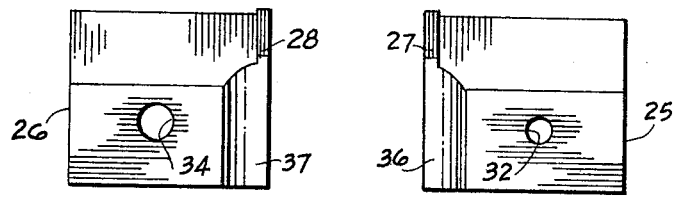
FIGURE 5 is a sectional elevation taken along lines V—V of FIGURE 3.
FIGURE 6 is a sectional elevation taken along lines VI—VI of FIGURE 3.

As will be understood from FIGURE 3, the bearing lands 27, 28 are closely aligned on the centerline of shaft hold-down bolt 45. The use of narrow bearing lands and their alignment on the centerline of the hold down bolt are important structural features in that the way or shaft is not deflected when the shaft bolt 45 is tightened to secure the shaft in the desired position. Also, the narrow bearing lands tolerate some degree of cocking in the shaft and thereby cooperate with the three-legged bottom of base 14 to permit usage of the mounting unit on rough or uneven surfaces.

Figure 7:
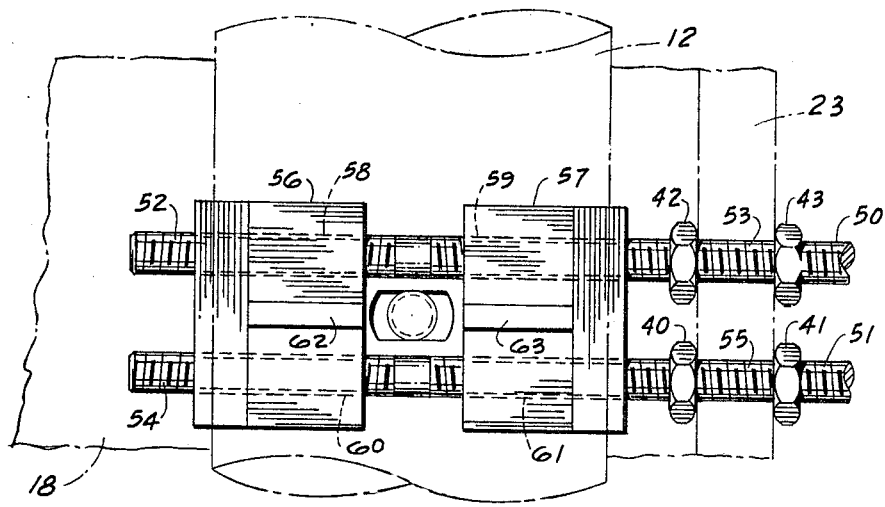
FIGURE 7 is a fragmentary top plan view, partly diagrammatic, showing a modified embodiment of the way supporting members and adjustment screw in accordance with this invention.
Figure 8:
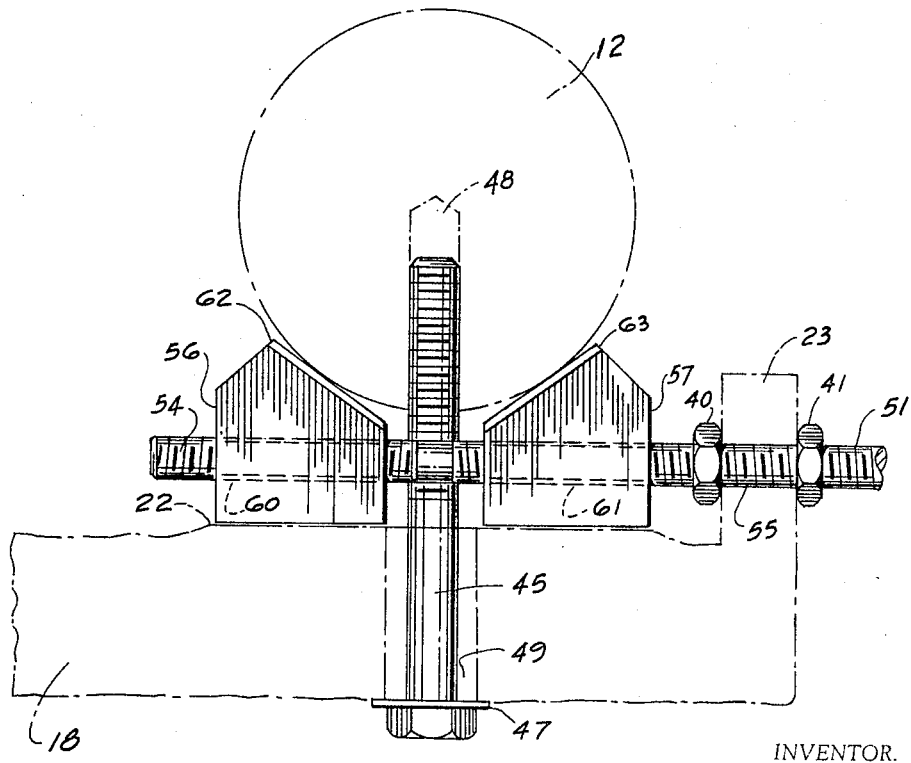
FIGURE 8 is a fragmentary front elevation partly diagrammatic, of the modified embodiment illustrated in FIGURE 7.
Figure 9:
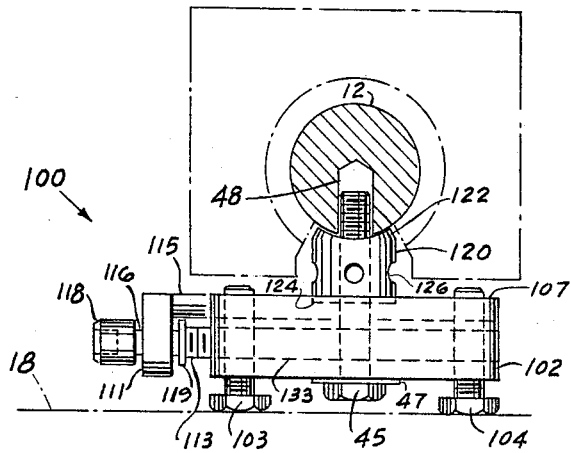
FIGURE 9 is a front elevation of a modified way mounting unit constructed in accordance with the invention, supporting a way on which a machine tool or the like is mounted as illustrated diagrammatically.
Figure 10:
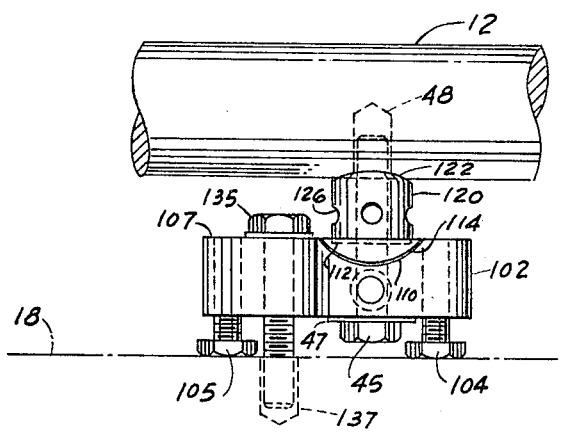
FIGURE 10 is a side elevation of the modified embodiment illustrated in FIGURE 9.
Figure 11:
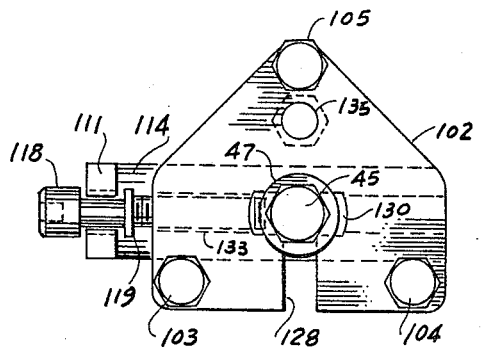
FIGURE 11 is a bottom plan view of the modified embodiment illustrated in FIGURE 9.
Figure 12:
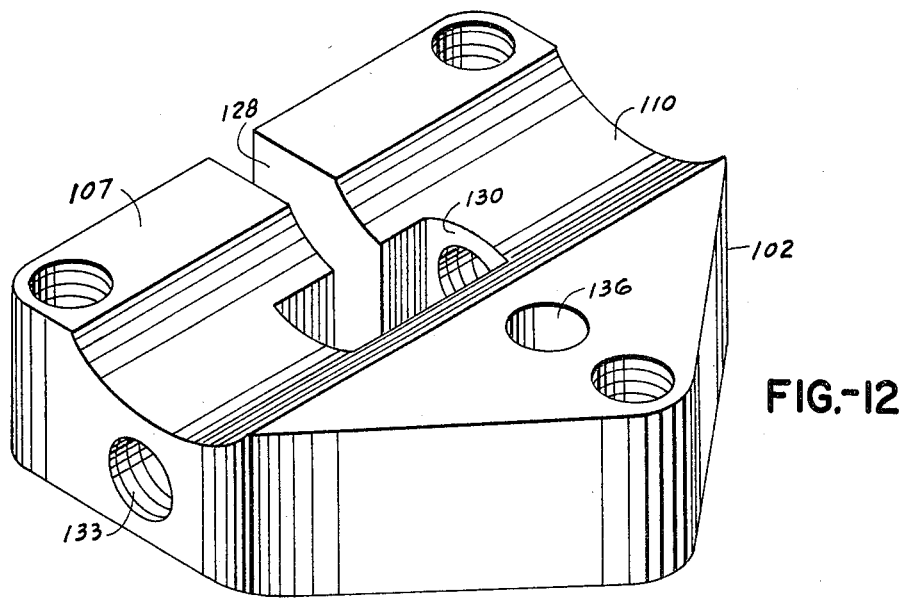
FIGURE 12 is an enlarged perspective view of the base member of the modified mounting unit illustrated in FIGURE 9.
Figure 14:
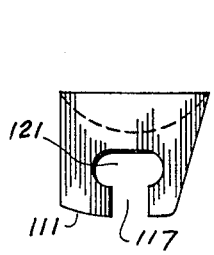
FIGURE 14 is an end view of the pad member illustrated in FIGURE 13, showing the bracket portion thereof.
Figure 13:
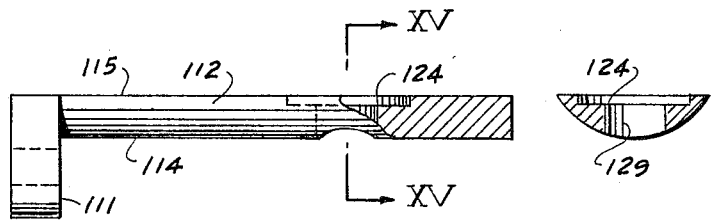
FIGURE 13 is an enlarged side elevation, partly in section, of the pad member which is adjustably attached to the base member illustrated in FIGURE 12.
Figure 15:
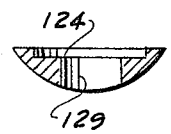
FIGURE 15 is a sectional view taken along line XV—XV of FIGURE 13.
Figures 16, 17:
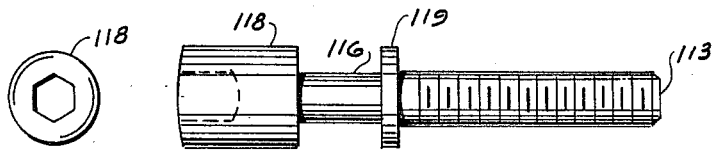
FIGURE 16 is an enlarged side elevation of the screw member which is mounted in the bracket portion of the pad member illustrated in FIGURE 13.
FIGURE 17 is an end view of the screw member illustrated in FIGURE 16.

In FIGURES 7 and 8 there is illustrated an alternate modified embodiment of the way supporting means and vertical and horizontal adjustment means in accordance with the invention. As alternatively embodied, the vertical and horizontal adjustment means comprises two adjusting screws 50, 51 each having left- and right-hand threads, 52, 53 and 54, 55, respectively, symmetrically engaging supporting blocks 56, 57 through threaded bore holes 58, 59 and 60, 61, respectively, on either side of centrally disposed, oppositely inclined, bearing lands 62, 63.

The embodiment of FIGURES 7 and 8 operates in a manner similar to that of FIGURES 1–6. Thus, bearing lands 62, 63 are narrow and closely aligned to the centerline of shaft hold-down bolt 45. An elongated slot 49 is formed in the base to permit lateral movement of bolt 45 corresponding to the lateral movement of the supporting blocks. Each adjustment screw has right- and left-hand threads and is provided with jam nuts 40, 41, 42, 43 for accomplishing the vertical and horizontal adjustments in the position of the way. While the modified embodiment of the mounting unit is illustrated as applied directly to a machine base having a smooth surface 22 formed thereon, it will be apparent that it likewise may be provided integral with a base member, in a manner similar to that illustrated in FIGURE 1.

With particular reference to FIGURES 9–16, there is illustrated a modified version of a way mounting unit, designated generally by reference numeral 100, in accordance with my invention. While modified mounting unit 100 is illustrated with a base provided integral therewith, it will be understood that the unit may be mounted directly onto a machine bed or base as in the case of the embodiments previously described.

Base 102 of mounting unit 100 has threadedly mounted therein three triangularly spaced bolts 103, 104, 105, so that their downwardly extending heads rest on the frame or bed 18 of a machine or machine tool. A base hold-down bolt 135 is mounted in bore hole 136 in base 102 and threaded into a threaded borehole 137 drilled in the machine frame or bed and tightened down against the base to hold the mounting unit firmly in place. As in my previous embodiment, this three-point bearing prevents rocking of the base when used on rough or uneven surfaces; the adjustability of legs 103, 104, 105 provides additional stability. The upper portion of base 102 is provided with a transverse, elongated, generally curvilinear recess 110 in which is slidably mounted a finger-like pad 112, having at least a portion of its lower surface curvilinear, indicated by reference numeral 114 in the illustrated embodiment, so as to mate with recess 110 and its upper surface 115 generally flat and co-planar with the top surface 107 of base 102.

As alternately embodied, the means for supporting and aligning way 12 comprises a hollow preferably cylindrical member 120, whose upper peripheral surface 122 is preferably symmetrically contoured such that diametrically opposed surfaces on the contour constitute the bearing surfaces contacting the way. Cylindrical supporting member 120 is seated in mating recess 124 formed in pad 112 and is provided with spaced holes 126 about its circumference in which a bar or other instrument (not shown) may be inserted for rotating the cylindrical member. Due to the varying heights of the contoured surface contacting the way, rotation of the cylindrical member varies the spacing of the way from the base, raising or lowering the vertical position of the way.

As alternately embodied, the horizontal or lateral adjustment means according to the invention comprises finger-like pad member 112, which is adjustably attached to base 102 by screw member 113, mounted in a bracket 111 extending from one end of pad 112, and threadedly engaging borehole 133, formed in base 102 parallel with the longitudinal axis of recess 110. Bracket 111 has slotted opening 117 of reduced diameter in which screw 113 is mounted by means of the cylindrical portion 116 formed between head 118 and collar 119. Thus, pad member 112 and, hence, cylindrical supporting member 120, may be moved to the desired lateral position by rotating screw 113 in either a clockwise or counterclockwise direction. Additionally, slotted opening 117 of bracket 111 is elongated at the termination 121 thereof, permitting pad 112 to be adjusted about its transverse axis. This adds a further adjustment feature to the mounting unit in that it will tolerate a small degree of cocking in the shaft.

In my alternative embodiment, the means for securely holding way 12 in the desired position in contact against the bearing surface 122 of the supporting member 120 is similar to that previously described. Thus, shaft hold-down bolt 45 is fitted through open passageway 128 in base 102, passing through hole 129 in pad 112, through the center of the hollow cylindrical member 120, and into threaded engagement with the way by means of borehole 48 provided therein. At the end of passageway 128, an elongated slot 130, formed transversely of the passageway, permits lateral movement of bolt 45 corresponding to the lateral movement of pad 112 and supporting member 120. As illustrated in the previous embodiments the head of bolt 45 bears against the underside of base 102 by means of washer 47.

While the foregoing description has been confined to describing a single mounting unit, it will be understood that in aligning a round machine way, or a pair of ways, two or more of such mounting units will generally be used, the number depending on the accuracy of alignment desired or required, and the length of the way.

In operation, one or more way mounting units having either single or double adjustment screws or a rotary adjustment are mounted onto the frame of a machine or machine tool, either directly to a smooth surface thereon or by means of a base member integral with the mounting unit. The units are mounted in substantial longitudinal alignment with the round machine way, the number and spacing therebetween being dependent on the desired degree of accuracy in the alignment of the way. At each mounting station, the shaft hold-down bolt and jam nuts are loosened and the vertical adjustment rotated either clockwise or counterclockwise to adjust the way to the desired vertical position. Thereafter the supporting members are adjusted to the desired horizontal or lateral position and secured in such position by tightening down the jam nuts or set screws on the bracket or post portion of the base. The round machine way being adjusted and "warped" into the desired position, the shaft hold-down bolt is tightened, thereby securing the shaft in the desired warped position of straightness and parallelism.

It will be understood that the method of establishing or checking the straightness and parallelism of the way will vary depending on the accuracy requirements. Optical devices, such as collimators or alignment telescopes, can be used to advantage for very precise applications, while accurate levels, straight edges, micrometers and indicators will generally suffice for the majority of applications which have less stringent precision requirements, all of which will be apparent to those skilled in the art.

The invention in its broader aspects is not limited to the specific embodiments herein shown and described but departures may be made therefrom within the scope of the accompanying claims, without sacrificing its chief advantages.

What is claimed is:

1. A mounting unit for supporting and aligning a round machine way in a desired position, comprising: a base, means mounted on the base for supporting said way, vertical adjustment means for adjusting the vertical position of said way, and horizontal adjustment means for independently adjusting the horizontal or lateral position of said way, said vertical and horizontal adjustment means each affecting only one of the positions of the way.

2. A mounting unit as claimed in claim 1 having means for securely holding said way in contact with said supporting means in its adjusted position.

3. A mounting unit as claimed in claim 1 wherein said supporting means comprises a pair of laterally variably spaced blocks, said blocks having opposed, inclined faces constituting the bearing surfaces contacting said way.

4. A mounting unit as claimed in claim 3 wherein said means for holding said way in contact with the bearing surfaces of the supporting blocks comprises a bolt mounted in said base and threadably engaging said way, said bolt positioned between said supporting blocks in substantial alignment with the longitudinal centerline of said bearing surfaces.

5. A mounting unit as claimed in claim 4 wherein said vertical adjustment means comprises at least one screw mounted in threaded engagement with said supporting blocks, said screw having right-handed threads engaging one of said blocks and left-handed threads engaging the other of said blocks.

6. A mounting unit as claimed in claim 5, wherein said horizontal adjustment means comprises threaded engagement means co-acting with said base and said supporting blocks whereby said supporting blocks may be laterally adjusted in unison.

7. A mounting unit for a round machine way including, in combination: a base member, a pair of laterally spaced members having inclined faces forming a recess to engage and support the way, means for moving said members towards and away from each other to thereby move the way in a vertical direction, means for bodily moving the members in unison to laterally move the way in either lateral direction, each of said means operating independently of each other, and means for forcing the way into firm contact with the faces of said members, whereby the way may be moved independently in vertical and lateral directions and securely held in the desired adjusted position.

8. A round machine way mounted on a base member by a plurality of mounting stations, each mounting station comprising means for vertically moving the round way, means for laterally moving the way to either side, and means for holding the way against vertical and lateral movement whereby the way may be accurately positioned and warped into the required straightness.

9. A round machine way mounted on a base member by a plurality of mounting stations, each mounting station being confined within 180° of the round machine way and comprising means for vertically moving the way with respect to the base member, means for laterally moving the way to either side, and means opposing vertical and lateral movement of the way whereby the way may be accurately positioned and warped into the required straightness and securely held in its adjusted position.

10. A mounting unit for supporting and aligning a round machine way in a desired position, comprising: a base, means for varying the spacing of the way from said base, horizontally movable means for varying the lateral position of the way, holding means for holding the way against said means, said means moving with said horizontally movable means, said means and said horizontally movable means each affecting only one of the positions of the way.

11. A mounting unit for supporting and aligning a round machine way in a desired position, comprising: a base, rotatable means for varying the spacing of the way from said base, horizontally movable means for varying the lateral position of the way, holding means for holding the way against said rotatable means, said rotatable means moving with said horizontally movable means, said rotatable means and said horizontally movable means each affecting only one of the positions of the way.

12. A mounting unit as claimed in claim 11 wherein said rotatable means comprises a hollow cylindrical member, the upper peripheral surface of which is contoured, diametrically opposed surfaces on said contour constituting the bearing surfaces contacting said way, whereby rotation of said cylindrical member raises and lowers the vertical position of the way.

13. A mounting unit as claimed in claim 11 wherein said horizontally movable means are rockably mounted on said base.

14. A mounting unit as claimed in claim 11, wherein said means for holding the way against the rotatable supporting member comprises a bolt mounted to said base within said member and threadably engaging said way.

No references cited.

ARTHUR L. LA POINT, *Primary Examiner.*

R. A. BERTSCH, *Assistant Examiner.*